United States Patent [19]

Weissgerber et al.

[11] Patent Number: 4,997,879

[45] Date of Patent: Mar. 5, 1991

[54] NOVEL ADHESIVE DISPERSIONS

[75] Inventors: Rudolf Weissgerber; Klaus Marquardt, both of Burghausen; Peter Ball, Emmerting; Manfred Selig; Fritz Stallbauer, both of Burghausen, all of Fed. Rep. of Germany

[73] Assignee: Wacker-Chemie GmbH, Fed. Rep. of Germany

[21] Appl. No.: 180,378

[22] Filed: Apr. 12, 1988

Related U.S. Application Data

[63] Continuation-in-part of Ser. No. 888,887, Jul. 23, 1986, abandoned.

[30] Foreign Application Priority Data

Sep. 4, 1985 [DE] Fed. Rep. of Germany ....... 3531601

[51] Int. Cl.$^5$ .................................................. C08L 33/00
[52] U.S. Cl. ...................................... 524/823; 524/817; 524/820; 526/318.44; 526/318.45
[58] Field of Search .................. 524/823, 817, 820; 526/318.44, 318.45

[56] References Cited

U.S. PATENT DOCUMENTS

| | | | |
|---|---|---|---|
| 3,755,237 | 8/1973 | Isaacs et al. | 526/318.45 X |
| 3,769,254 | 10/1973 | Anderson et al. | 526/318.44 X |
| 3,817,896 | 6/1974 | Bergmeister et al. | 524/823 X |
| 4,044,197 | 8/1977 | Wiest et al. | 526/304 |
| 4,073,779 | 2/1978 | Wiest et al. | 526/304 X |
| 4,322,516 | 3/1982 | Wiest et al. | 526/307.7 |
| 4,661,557 | 4/1987 | Bubam et al. | 524/823 X |

FOREIGN PATENT DOCUMENTS

| | | | |
|---|---|---|---|
| 0073235 | 6/1978 | Japan | 524/823 |
| 0226076 | 12/1984 | Japan | 526/318.44 |

*Primary Examiner*—Joseph L. Schofer
*Assistant Examiner*—J. M. Reddich
*Attorney, Agent, or Firm*—Bierman and Muserlian

[57] ABSTRACT

Novel pressure-sensitive aqueous adhesive dispersions comprising 40 to 65% by weight, based on the dispersion weight, of a copolymer produced by radical emulsion polymerization of ethylene, vinyl esters of saturated carboxylic acids of 2 to 12 carbon atoms, ethylenically unsaturated carboxylic acids, ethylenically unsaturated hydroxyalkyl functional compounds, optionally present (meth)acrylic acid esters with alkyl of 4 to 12 carbon atoms and optionally present mono- or polyethylenically unsaturated compounds having a second order transition temperature of $-20°$ to $-60°$ C. and a K value of 50 to 180, characterized in that the copolymer was obtained by polymerization of (a) 10–45% by weight of ethylene
(b) 0–25% by weight of acrylic ester(s)
(c) 40–89% by weight of vinyl ester(s)
(d) 0.5–4% by weight of ethylenically unsaturated carboxylic acids
(e) 0.5–10% by weight of ethylenically unsaturated hydroxyalkyl-functional compounds
(f) 0–0.3% (meth)acrylamide
(g) 0–10% ethylenically unsaturated sulfates and sulfonates or polyethylenically unsaturated compounds, in the presence of 1 to 6% by weight, based on the comonomer mixture, of an emulsifier.

7 Claims, No Drawings

NOVEL ADHESIVE DISPERSIONS

PRIOR APPLICATION

This application is a continuation-in-part of U.S. patent application Ser. No. 888,887 filed July 23, 1986, now abandoned.

STATE OF THE ART

U.S. Pat No. 4,322,516 describes pressure-sensitive adhesives based on aqueous dispersion of a copolymer of ethylene, acrylic acid esters of alcohols with 4 to 12 carbon atoms, vinyl acetate, optionally substituted (meth)acrylamide, as well as optionally additional olefinically unsaturated monomers miscible with water in any desired ratio or monomer-soluble or polyolefinically unsaturated monomers wherein the second order transition temperature of the copolymer is in the range of −20° to −60° C. and the K value [Fikentscher, measured in tetrahydrofuran] is in the range of 50 to 180. These known pressure-sensitive adhesives have an excellent cohesion, but the adhesion and adhesiveness on some substrates, e. g. glass and similar supports, often are unsatisfactory, especially at elevated temperature.

OBJECTS OF THE INVENTION

It is an object of the invention to obtain an aqueous adhesive dispersion having the desirable features of known dispersions and improved adhesion to a plurality of bases including glass and similar substrates at elevated temperatures of up to 100° C., especially at 60° C., and a process for their preparation.

This and other objects and advantages of the invention will become obvious from the following detailed description.

THE INVENTION

The novel aqueous pressure-sensitive adhesive dispersion of the invention is comprised of 40 to 65% by weight, based on the dispersion weight, of a copolymer produced by radical emulsion polymerization of ethylene, vinyl esters of saturated carboxylic acids of 2 to 12 carbon atoms, ethylenically unsaturated carboxylic acids, ethylenically unsaturated hydroxylalkyl functional compounds, optionally present (meth)acrylic acid esters with alkyl of 4 to 12 carbon atoms and optionally present mono- or poly-ethylenically unsaturated compounds having a second order transition temperature of −20° to −60° C. and a K value of 50 to 180, characterized in that the copolymer was obtained by polymerization of (a) 10–45% by weight of ethylene
(b) 0–25% by weight of acrylic ester(s)
(c) 40–89% by weight of vinyl ester(s)
(d) 0.5–4% by weight of ethylenically unsaturated carboxylic acids preferably with 3–4 carbon atoms
(e) 0.5–10% by weight of ethylenically unsaturated hydroxyalkylfunctional compounds
(f) 0–0.3% (meth)acrylamide
(g) 0–10% ethylenically unsaturated sulfates and sulfonates or polyethylenically unsaturated compounds in the presence of 1 to 6% by weight, referred to the comonomer mixture, of at least one emulsifier.

Examples of component (b) are acrylic acid esters of alcohols of 4 to 12 carbon atoms and the amount used, based on the total weight of the monomer mixture, is 0 to 25%, preferably 0 to 15%, by weight. Preferably n-butyl acrylate and/or 2-ethyl-hexyl acrylate are used.

Examples of component (c) are vinyl esters such as vinyl acetate, vinyl propionate, vinyl laurate and vinyl esters of Versatic acid sold by Shell AG, especially those of 10 carbon atoms. The amount of compound (c) used is 40 to 89%, preferably 55 to 80%, by weight of the monomer mixture.

Examples of component (d) are ethylenically unsaturated carboxylic acids such as α, β-unsaturated carboxylic acids. Preferred acids are methacrylic acid and most preferably acrylic acid. The acids are used in amounts of 0.5 to 4% by weight of the monomer mixture.

The problems of obtaining a good heat-resistant pressure sensitive adhesive are surprisingly solved by preparing a copolymer of a monomer containing ethylenically unsaturated hydroxylalkyl functional compounds (e) in the claimed range with the other monomers in the recited ranges. Examples of component (e) are hydroxyethyl acrylate, 2-hydroxypropyl acrylate and allyl 6-hydroxycaproate. The amount of component (e) used is 0.5 to 10%, preferably 1 to 6%, by weight of the monomer mixture.

Examples of (f) are acrylamide and methacrylamide in an amount of up to 0.3%, by weight of the monomer mixture.

Examples of component (g) are ethylenically unsaturated sulfates and sulfonates such as alkali metal salts of vinyl sulfonic acid and polyunsaturated compounds such as divinyl adipate (up to 10% by weight of monomer mixture).

It was surprising that with the incorporation of ethylenically unsaturated hydroxyalkyl functional compounds into the copolymer the adhesiveness and adhesion of the pressure-sensitive adhesives at elevated temperatures can drastically be increased. In the State of Art such hydroxy functional comonomers are only known as sites for postpolymerization crosslinking to enhance the cohesive strength of pressure-sensitive or as polar comonomers which increase the stability of aqueous adhesive dispersions.

Despite the low content of acrylamide which is imperative, otherwise the effect of the hydroxyalkyl functional compounds would be overcompensated, the adhesives have an excellent cohesion.

The novel process of the invention for the preparation of the aqueous pressure-sensitive dispersions of the invention comprises radically polymerizing comonomers (b) to (g) as defined above under an ethylene pressure of preferably 20 to 110 bars at 30° to 80° C. in the presence of 1 to 6% by weight, based on the total monomer weight, of at least one emulsifier.

The polymerization may be effected in conventional autoclaves or pressure vessels and preferably some of the comonomers are added during the polymerization. For instance, at least 30% of component (c) is preferably added after the beginning of the polymerization while components (b) and (e) may be added all at the beginning, added entirely after the start of polymerization or partly added at the beginning and partly during polymerization. Component (d) may be added all at the beginning or added entirely during the polymerization. In a preferred mode, the weight ratio of monomer initial charge and addition during polymerization is 1:5 to 5:1. Component (f) is preferably added initially. Component (g) may be added during the polymerization to very advantageously control the rheology and stability of the dispersion. All additions during polymerization are preferably effected continuously in proportion to the rate of consumption.

The ethylene pressure established at the beginning of the polymerization can be maintained constant over the entire polymerization duration by pumping in more ethylene but it is also possible not to add ethylene to replenish the initial ethylene or to vary the ethylene pressure within the range of preferably 20 to 100 bar during the polymerization. Preferably, the initially selected ethylene pressure is maintained constant during the polymerization and then postpolymerization may be carried out in the known manner.

The polymerization is carried out by initiation with conventional water-soluble radical formers which are employed preferably in amounts of 0.03 to 3% by weight, based on the total weight of the comonomers. Examples of said radical formers are persulfates, hydroperoxides and perphosphates such as ammonium and potassium persulfate and tertiary butyl hydroperoxide. Preferred is the activation of the radical formers by reducing agents, particularly formaldehyde sulfoxylate, and preferably one or both redox catalyst components are dosed during the polymerization.

The polymerization reaction is carried out at a pH of preferably 3 to 5 in the presence of the usual emulsifiers, particularly alkyl and alkaryl ethoxylates which optionally contain in addition a sulfate, phosphate, succinate or sulfonate group, and are preferably used in amounts of 2 to 5% by weight. The emulsifiers can either be charged or else dosed at least partially. To regulate the pH value, acids such as formic acid, acetic acid, hydrochloric acid, sulfuric acid, or bases such as ammonia, amines, sodium hydroxide, potassium hydroxide, calcium hydroxide, or the usual buffer salts e. g. alkali metal acetates, alkali metal carbonates, alkali metal phosphates may be added.

To regulate the molecular weight, known regulators, e.g. mercaptans, aldehydes or chlorinated hydrocarbons, may be added during the polymerization.

The use and possible packaging of the pressure-sensitive adhesive dispersions are described in U.S. Pat. No. 4,332,516.

In the following examples there are described several preferred embodiments to illustrate the invention. However, it is to be understood that the invention is not intended to be limited to the specific embodiments. In the following examples all percentage values are by weight, if not mentioned otherwise.

COMPARATIVE EXAMPLE A

A mixture of 5200 g of water, 97 g of sodium sulfate of nonylphenol polyglycol ether with about 25 glycol units, 48 g of an alkyl sulfonate with 15 carbon atoms, 21 g of acrylamide, 70 g of acrylic acid, 2160 g of vinyl acetate, 840 g of vinyl laurate and 400 g of 2-ethylhexyl acrylate were emulsified in a 16 liter autoclave equipped with a stirrer and the emulsion was heated to 50° C. The autoclave was then charged with ethylene at a pressure of 60 bars and then polymerization was started by simultaneous additions of a 10% ammonium persulfate solution and of a 5% sodium formaldehyde sulfoxylate solution at 80 ml/hour each. Polymerization was continued with simultaneous dosage of 40 ml/hour of the two solutions.

After polymerization began which was determined by a pressure increase of about 2 bars, a mixture of 2280 g of vinyl acetate and 600 g or vinyl laurate and a solution of 285 g of the said sodium nonylphenol polygylcol ether sulfate, 120 g of acrylic acid and 18 g of concentrated ammonium hydroxide solution and 530 g of water were metered in during 8 hours. After about two hours of addition or the monomer mixture and the mentioned solution, the ethylene pressure dropped to 60 bars and it was necessary to continuously add more ethylene to maintain the said pressure. After completion of the monomer mixture and solution addition, the ethylene pressure was maintained at 60 bars for another 90 minutes and addition of the initiator solutions was continued for another six hours during which the ethylene pressure dropped to 25 bar. After cooling and blowing down, there was obtained an aqueous dispersion with a 56.6% solids content, a viscosity of 450 mPa.s (Epprecht Rheometer STV, C III), a K value of 84 [Fikentscher, Cellulose Chemie, Vol. 13 (1932), p. 58 measured in 1% tetrahydrofura solution] and an ethylene content of 32% in the solid phase.

EXAMPLE 1

The procedure of comparison Example A was repeated except that 200 g of 2-hydroxy-ethyl acrylate were added to the monomer mixture added during the polymerization. The resulting dispersion had a 57,4% soldis content, a viscosity of 700 mPa.s, a K value of 90.5 and a 32.5% content of ethylene in the solid phase.

EXAMPLE 2

The procedure of comparison Example A was repeated except that 400 g of 2-hydroxyethyl acrylate were added to the monomer mixture during the polymerization. The resulting dispersion had a 56.7% solids content, a viscosity of 630 mPa.s a K value of 94 and a 30.5% content of ethylene in the solid phase.

COMPARATIVE EXAMPLE B

The procedure of Example 2 was repeated with the amount of acrylamide in the polymerization charge was 84 g rather than 21 g and the resulting dispersion had a 55.77% solids content, a viscosity of 1,090 mPa.s, a K value of 84 and 29.5% ethylene content in the solid phase.

The four aqueous dispersions were then tested for hot peeling resistance, surface adhesiveness (tack), and peel strength (adhesive power). Tests were done with dry coatings produced from the dispersions. The term "adhesive strip" in the following discussion of the test procedures means a flexible foil support material of plasticized polyvinyl chloride 100μ thick coated with dry film of the said dispersions 25μ thick.

A. Hot peeling resistance test

An adhesive strip measuring $5 \times 8$ cm$^2$ was placed with a surface of $5 \times 5$ cm$^2$ on a crystal glass plate and the strip was pressed with a steel roll weighing 2.2 kg and covered with silicone rubber by rolling back and forth twice. The gluing on was effected so that the free end of the adhesive strip protruded over a long side of the glass plate. A weight of 50 g was immediately attached to the free end of the adhesive strip and the glass plate with the glued on adhesive strip on the underside was fixed in a drying oven preheated to 50° C. so that there resulted an angle of 90° between the glued and the free ends of the adhesive strip. The attachment of the weight was designed so that the force acted uniformly over the entire width of the adhesive strip. The time in which the adhesive strip was peeled off at 50° C. under the constant load of 50 g over a distance of 1 cm was determined. To get this time the peeled distance was measured after an adequate testing time and the quotient of testing time in minutes and peeling distance in centimeters was determined. The values in the following Table are averages from three individual test measurements.

B. Surface adhesiveness (tack)

An adhesive strip 20 cm long and 2.5 cm wide was clamped hanging vertically in the form of a "loop" with the adhesive layer to the outside in the upper jaw of a tensile tester. Then, by moving the two jaws of the tensile tester together, the "loop" was placed vertically onto a horizontally fastened, carefully cleaned glass plate without application of pressure in length of about 3 cm at a rate of 100 mm/minute. Thereafter, the adhesive strip was immediately pulled off the glass surface at the same speed and the greatest force required for the pulling off of the "loop" was taken as a measure of its surface adhesiveness. The stated value is the average of five individual test measurements using a fresh adhesive strip and a fresh glass surface each time.

C. Peel strength (adhesive power)

An adhesive strip 20 cm long and 2.5 cm wide was placed blister-free, starting at one end, in a length of about 12 cm on a carefully cleaned crystal glass plate. The adhesive strip was based on by rolling (back and forth) 5 times with a steel roll weighing 2.2 kg and covered with silicone rubber. After storage in an air-conditioned chamber at 23° C. and 50% relative humidity for 8 minutes and for 24 hours, respectively, the adhesive strip was pulled off over a length of 5 cm at a rate of 300 mm/minute at an 180° angle. The average force required for this was measured. The stated values are averages of 5 individual test measurements in each case.

For all measurements, the adhesive dispersions were applied onto the support foils with a doctor blade in a thickness such that after the crying a uniform polymer layer of 24 to 26 g/m² remained. The cleaning of the glass surfaces used in the tests was done by mechanical removal of visible dirt with water and possibly cleaners and subsequent placement in an acetone bath. Before the test surfaces thus cleaned were used, the plates were stored for at least 48 hours in a standard climate of 23° C./50% rel. humidity.

The results are reported in the following Table.

TABLE

| Dispersion Example No. | Hot peeling resistance (min/cm at 50° C. | Surface adhesiveness (N/2.5 cm) | Peel strength (N/2.5 cm) on glass after a gluing time of | |
|---|---|---|---|---|
| | | | 8 min. | 24 hrs. |
| A | 282 | 9.0 | 9.6 | 11.1 |
| 1 | 1234 | 8.7 | 10.2 | 14.0 |
| 2 | 8200 | 8.3 | 8.7 | 18.1 |
| B | 48 | 4.7 | 9.0 | 15.6 |

Various modifications of the dipsersions and process of the invention may be made without departing from the spirit or scope thereof and it should be understood that the invention is intended to be limited only as defined in the appended claims.

We claim:

1. A pressure-sensitive aqueous adhesive dispersion comprising 40 to 65% by weight, based on the dispersion weight, of a copolymer produced by radical emulsion polymerization of ethylene, vinyl esters of saturated carboxylic acids of 2 to 12 carbon atoms, ethylenically unsaturated carboxylic acids, ethylenically unsaturated hydroxylalkyl functional compounds, optionally present (meth)acrylic acid esters with alkyl of 4 to 12 carbon atoms and optionally present mono- or polyethylenically unsaturated compounds and having a second order transition temperature of $-20°$ to $-60°$ C. and a K value of 50 to 180, characterized in that the copolymer was obtained by polymerization of
   (a) 10–45% by weight of ethylene
   (b) 0–25% by weight of acrylic ester(s)
   (c) 40–89% by weight of vinyl ester(s)
   (d) 0.5–4% by weight of ethylenically unsaturated carboxylic acids
   (e) 0.5–10% by weight of ethylenically unsaturated hydroxyalkyl functional compounds
   (f) 0–0.3% (meth)acrylamide
   (g) 0–10% ethylenically unsaturated sulfates and sulfonates or polyethylenically unsaturated compounds
in the presence of 1 to 6% by weight, referred to the comonomer mixture, of at least one emulsifier.

2. The adhesive dispersion of claim 1 wherein the acrylic acid ester is at least one member of the group consisting of n-butyl acrylate and 2-ethylhexylacrylate.

3. The adhesive dispersion of claim 1 wherein the ethylenically unsaturated carboxylic acid is at least one member of the group consisting of acrylic acid and methacrylic acid.

4. The adhesive dispersion of claim 2 wherein the ethylenically unsaturated carboxylic acid is at least one member of the group consisting of acrylic acid and methacrylic acid.

5. The adhesive dispersion of claim 1 wherein the ethylenically unsaturated hydroxyalkyl functional compound is at least one member of the group consisting of 2-hydroxyethyl acrylate and 2-hydroxypropyl acrylate.

6. The adhesive film prepared from a dispersion of claim 1.

7. The adhesive dispersion of claim 2 wherein the ethylenically unsaturated hydroxyalkyl functional compound is at least one member of the group consisting of 2-hydroxyethyl acrylate and 2-hydroxypropyl acrylate.

* * * * *